Nov. 17, 1970   R. NUTT   3,541,448
DIGITAL TIME INTERVALOMETER WITH ANALOGUE VERNIER TIMING
Filed May 7, 1968   3 Sheets-Sheet 2

INVENTOR.
Ronald Nutt
BY
Roland A. Anderson
ATTORNEY.

United States Patent Office 3,541,448
Patented Nov. 17, 1970

3,541,448
DIGITAL TIME INTERVALOMETER WITH ANALOGUE VERNIER TIMING
Ronald Nutt, Knoxville, Tenn., assignor to the United States of America as represented by the United States Atomic Energy Commission
Filed May 7, 1968, Ser. No. 727,178
Int. Cl. G04f 9/00
U.S. Cl. 324—186                        5 Claims

ABSTRACT OF THE DISCLOSURE

A digital intervalometer has been provided for determining the exact time interval between a "start" and "stop" signal by counting the number of cycles of a continuously operating oscillator occurring between the application of the signals and measuring the time phase between the oscillator and the "start" and "stop" signals. Since the beginning and end of an interval occurs randomly with respect to the repetition rate of the oscillator signal, this development makes use of time-to-amplitude converters to derive an analogue signal proportional to the vernier times between the "start" and "stop" signals and reference points on the repetitive signal. The analogue signal is converted to digital data to be appropriately combined with digital counting of the repetitive signal cycles to provide an accurate time measurement.

BACKGROUND OF THE INVENTION

This invention was made during the course of, or under a contract with the U.S. Atomic Energy Commission.

The present invention relates generally to apparatus for the measurement of time, and more particularly relates to apparatus for precisely measuring the time interval between a pair of time spaced pulse signals.

Time interval measuring systems of the digital type are known in the art which generally take the form of one of two similar systems. One system starts a repetitive signal by starting, for example, an oscillator and stopping the oscillator at the end of a discrete time interval, counting the number of pulses or cycles occurring between the "start" and "stop" signals. The other system counts the number of cycles generated by a continuously operating ocsillator during the interval between a "start" and "stop" signal. Normally, the latter is used in precise measuring operations. By allowing the oscillator to operate continuously, a more uniform pulse shape is achieved. If the frequency of the oscillator is high, with respect to the expected interval duration, errors are minimized and uncertainties related to the starting and stopping of the counting are reduced. There is a limiting factor, however, in that the speed at which present counters and gating circuits will operate accurately is limited.

In applications where extremely good time resolution is required, some method must be utilized to account for the possible error at the beginning and end of the interval. For example, if the interval of time to be measured is not an exact multiple of the period of the oscillator, an error in exact measurement exists. This error can be reduced by increasing the oscillator frequency; but this adjustment, in turn, is dependent upon the maximum speed at which known types of counters and gating circuits can operate, and also upon the accuracy of the gating circuits used in the system. It will be apparent that the error may be as great as one complete cycle of the oscillator frequency. Therefore, when measuring time intervals in the range of microseconds or greater, there is a need for a device which will provide an accurate measurement.

One system utilized in the prior art to measure the error-producing time periods, normally referred to as vernier times, is to use multiple delay netwoks for delaying a "start" pulse for various times and determining with logic circuits the time until the beginning of the next oscillator cycle. Similar circuits are used to determine the time at the end of the interval when a "stop" pulse is applied. The resolution of this method depends upon the size of the increments covered by the delay networks as well as the accuracy thereof. These systems are generally very complex if good resolution is to be achieved.

SUMMARY OF THE INVENTION

This invention is a system for overcoming the above-mentioned limitations and complexity in conventional time interval measuring systems and has as its primary object to provide a digital intervalometer which has a very high resolution with reliable accuracy and a relatively simple means of vernier time measurement.

Further, it is an object of the present invention to provide a digital intervalometer which can be used with conventional scaler counters and time-to-amplitude converters.

Another object of the present invention is to provide a digital intervalometer for measuring time intervals in a continuously operating oscillator which utilizes a time-to-amplitude converter and a subsequent analogue-to-digital converter to measure the vernier times at the beginning and end of the time cycle which can be combined with the net count in a binary adder.

Briefly, the present invention resides in a system for accurately determining a time interval by measuring the number of cycles of an electrical wave from a continuously operating oscillator timer where the time interval is initiated by a "start" signal input and terminated by a "stop" signal input. The invention employs a first gating circuit to receive the "start" signal and the electrical wave to provide an enabling signal output at the end of one cycle of the electrical wave following the "start" signal. The "start" signal and the enabling signal start and stop, respectively, a first time-to-amplitude converter to provide an analogue signal proportional to the start venier time. Similarly, a second gating circuit receives the "stop" signal and the electrical wave to provide a disabling signal output at the end of one cycle of the electrical wave following the "stop" signal. The "stop" signal and the disabling signal start and stop, respectively, a second time-to-amplitude converter to provide an analogue signal proportional to the stop vernier time. Both of the analgue signals are then converted to digital form by means of separate analogue-to-digital converters. The enabling signal being coincident with the start of the first complete cycle of the electrical wave opens an output gate to pass the electrical wave to provide a net count of the cycles during the timing interval. The disabling signal closes the output gate and the net count taken from the output gate in digital form is algebraically added in an appropriate binary adder to the vernier times to provide the exact time interval measurement.

Other objects and many of the attendant advantages of the present invention will be readily evident from the following description when taken in conjunction with the accompanying drawings.

DESCRIPTION OF THE PREFERRED EMBODIMENT

Figure 1:
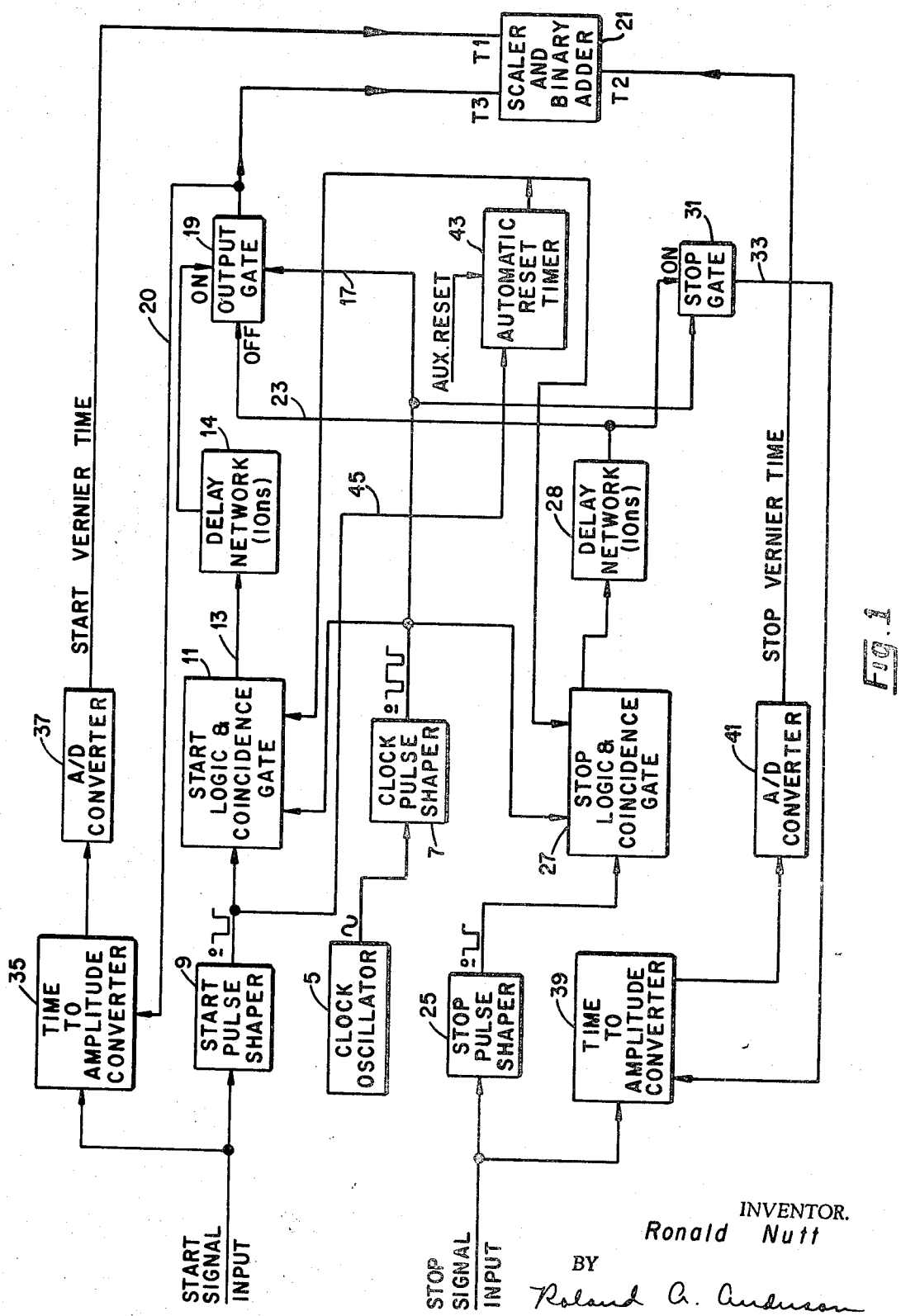
FIG. 1 is a block diagram of a digital intervalometer according to the present invention.

The system of FIG. 1 includes a system clock 5 which preferably is a crystal-controlled sine wave oscillator as it is essential that the oscillator be stable in frequency. The clock frequency is set at 20 mHz. The clock output is connected to a clock pulse shaper circuit 7 which provides a negative going output pulse of about 10 nanoseconds in width, and with a 50 ns. period. The leading edge of each pulse is synchronized with the zero crossover of the oscillator signal. This square wave clock signal is fed to several points in the system as described hereinafter.

A "start" signal is fed into a start pulse shaper 9. For each input start signal, the circuit provides a negative going pulse of approximately 100 ns. duration regardless of the input pulse width. This pulse is fed into a "start" logic and coincidence gate 11 together with the output from the clock pulse shaper 7 which provides an output signal on lead 13 when the first clock pulse is applied after a "start" signal is applied. The output of gate 11 is connected to a delay network 14 which delays the signal 10 ns. to insure that the first negative going excursion of the clock pulse following the "start" signal is not counted. The output of the delay network on lead 13 is connected to the "on" input terminal of an output gate 19. Gate 19 then passes the clock pulses applied thereto by means of lead 17 to a scaler and binary adder 21. Gate 19 is preferably a monostable switch which is triggered upon the application of each clock pulse once it has been enabled by the application of a signal to the "on" input terminal from delay network 14. The output pulse from gate 19 is of sufficient amplitude and width to be registered in the scaler and binary adder 21. Thus, beginnig with the second clock pulse, the pulses are registered in the scaler and binary adder 21 until stopped by the application of a disabling signal on lead 23 connected to the "off" input of gate 19 disabling the gate.

The disabling signal on lead 23 is initiated by the application of a "stop" signal to the input of a stop pulse shaper 25 which is similar to the start pulse shaper 9 discussed above. The shaper 25 generates a negative going output pulse of approximately 100 ns. duration upon the application of each "stop" pulse applied to its input. This output pulse is fed into a stop logic and coincidence gate 27 together with the output from the clock pulse shaper 7 and provides an output pulse to a 10-ns. delay network 28 upon the coincidence of the first negative going clock pulse and the stop pulse shaper 25 output. The delay network 28 delays the output on lead 23 so that the termination of the clock pulses being counted from the output of output gate 19 is on the second negative going excursion of the clock pulse. The output of delay network 28 is connected to the "on" input of a stop gate 31 so that the stop gate 31 is turned "on" simultaneously with the turning "off" of output gate 31. Thus, when the stop gate is turned "on" the clock pulses which are fed to an input of the stop gate 31 are gated to an output lead 33 for providing a properly shaped signal to terminate the "stop" venier timer coincident with the second negative going excursion of the clock pulse following the application of a "stop" signal.

In order to provide a start venier time measurement, the start input signal applied to shaper 9 is also applied to a time-to-amplitude converter 35. Converter 35 may be of any conventional design, such as a capacitor which is charged during the vernier timing interval from a fixed current so that the charge at any time is proportional to the elapsed charging time. The charging or vernier time interval begins upon the application of the "start" signal and is terminated by the application of the first counted clock pulse on lead 20 connected from the output of gate 19 to a separate input of converter 35. The amplitude of the analogue voltage is converted into digital information in any standard analogue-to-digital converter 37, and, with an appropriate scale factor applied, is added to the digital data representing the net count in the scaler and binary adder 21.

The stop vernier timer is similarly arranged. The "stop" signal is applied to a second time-to-amplitude converter 39 identical to converter 35 in the start vernier timer section. The charging or vernier time interval begins upon the application of the "stop" signal and is terminated by the application of the first clock pulse passed by the stop gate 31 on lead 33 connected to a separate input of converter 39. The analogue output signal of converter 39 is converted to digital data in another analogue-to-digital converter 41, and, with an appropriate scale factor applied, is subtracted from the net count in the scaler and binary adder 21. Thus, an accurate time measurement is made during the interval between the application of "start" and "stop" signals which can be stored in a conventional scaler and binary adder 21.

As shown in FIG. 1 an automatic reset timer 43 is provided which takes its initiating input from the output of the start pulse shaper 9 through lead 45. The timer 43 may be any type of conventional timing circuit such as a "one-shot" or monostable multivibrator that has a period greater than the time interval during which the desired information is gathered. When the timer times out, it provides an appropriate pulse at its output which is connected to separate inputs of the start and stop coincidence gates 11 and 27, respectively, returning them to their original state preparatory to receiving new "start" and "stop" signals. If desired, this reset may be acomplished at any time by injecting an appropriate reset signal to the auxiliary reset input to timer 43.

Figure 2:
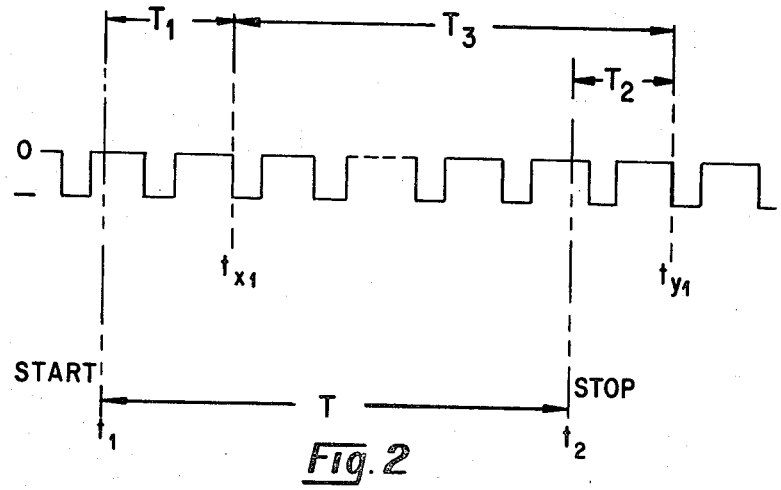
FIG. 2 is a diagram of a standard repetitive signal used for interval timing in the present intervalometer with notations for use in explaining the timing method of the system of FIG. 1.

The function of the above system may be more readily understood by reference to FIG. 2 wherein there is shown a train of uniform clock pulses in the form of a square wave which appears at the output of the clock pulse shaper 7. As can be seen, the "start" and "stop" signals appear randomly with respect to the beginning of a cycle of the square wave. The times $t_{x1}$ and $t_{y1}$ designate the end of one full cycle of the clock wave form following the start and stop signals, respectively. The scaler counter 21 operating during the time between $t_{x1}$ and $t_{y1}$ gives an exact number of counts which is proportional to this time which may be designated as $T_3$. The vernier times designated as $T_1$ and $T_2$ can then be used to obtain the desired time interval T according to the equation:

$$T = T_1 + T_3 - T_2$$

Figure 3:
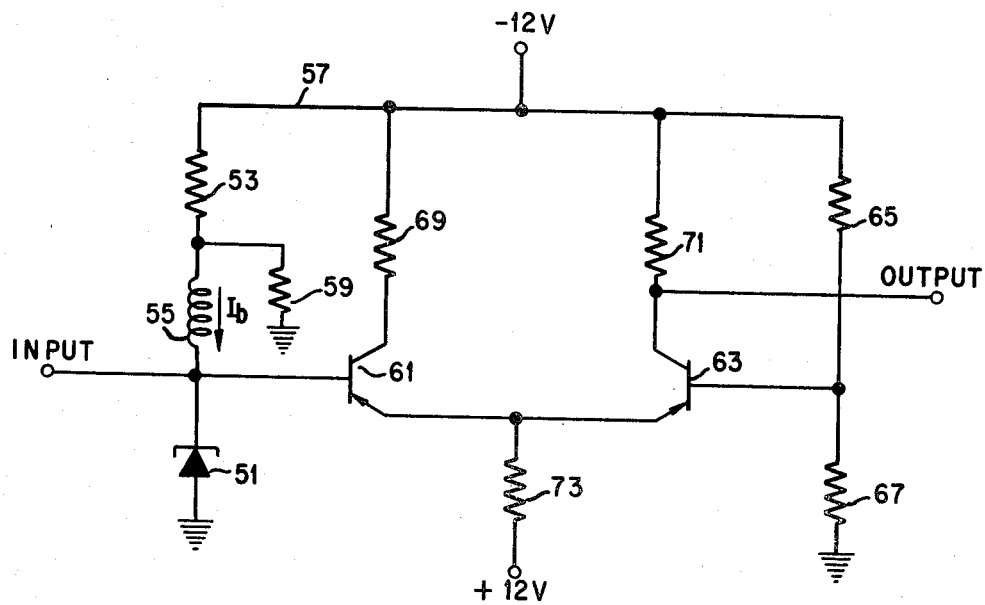
FIG. 3 is a schematic diagram of a monostable switch which may be employed in various circuits shown in block form in FIG. 1.
Figure 4:
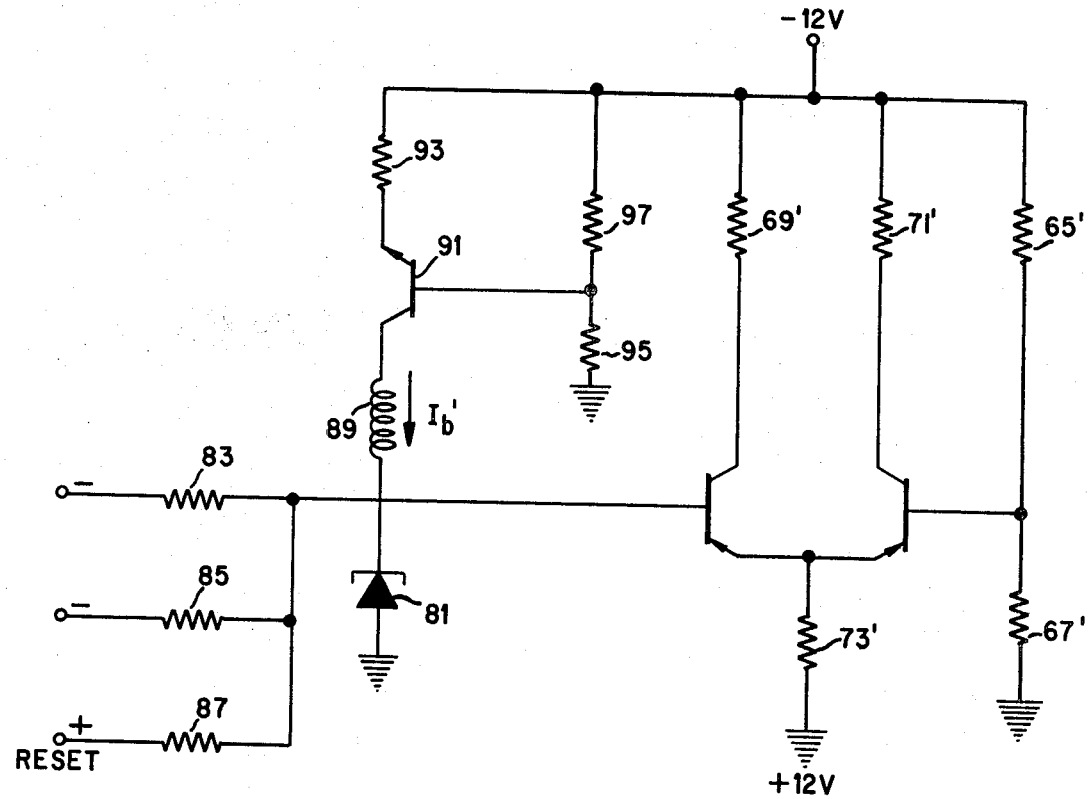
FIG. 4 is a schematic diagram of a bistable switch which may be employed in various circuits shown in block form in FIG. 1.

As pointed out above, the start pulse is applied at $t_1$ and starts the time-to-amplitude converter 35 which operates until time $t_{x1}$ to provide the output $T_1$ as designated in FIG. 1. The time $T_3$ is taken from the output of gate 19. The stop pulse is applied at time $t_2$ and starts the time-to-amplitude converter 39 which operates until time $t_{y1}$ to provide the stop vernier ouput $T_2$ (FIG. 1). These outputs may then be appropriately summed algebraically to obtain the exact time T, as at the output of adder 21, measured between the "start" and "stop" signals Each of the separate components of the system of FIG. 1 may be composed throughout of standard components. As pointed out above, the vernier timing sections are composed of a standard time-to-amplitude converter connected to any suitable analogue-to-digital converter. The "start" and "stop" pulse shaper 9, 25, the "start" and "stop" logic and coincidence gates, output gate 19 and stop gate 31 must operate with exceptional speed and accuracy so that pulses are not lost in gating the clock pulses to the counter. One particular circuit which may be designated as a tunnel diode triggered switch operates extremely well with a minimum of signal conditioning preceding its input. The switch can be modified to operate either as a monostable or bistable switch. The monostable switch is shown in FIG. 3 and the bistable switch is shown in FIG. 4. Since the circuits shown are conventional and form no part of the present invention they will be described only in sufficient detail to show their operation in the present circuit, reference being made to any standard diode and transistor circuit handbook.

Referring now to FIG. 3, the monostable switch receives an input pulse at the cathode of a tunnel diode 51 which has its anode connected to ground potential. For monostable operation the diode 51 is current biased by means of a current $I_b$ flowing through a series circuit including resistor 53 and an inductor 55 connected between a negative supply lead 57 and the cathode of diode 51. The value of resistor 53 is such that the bias current $I_b$ holds the diode below the voltage peak preceding the negative conductance region of the diode. An incoming trigger pulse then increases the current to the diode causing the diode to switch to an operating point well beyond the negative conductance region where the voltage drop across the diode increases substantially. The diode then remains in the state for a time depending upon the time constant of an L-R network consisting of inductor 55 and a resistor 59 connected between the end of inductor 55 opposite from the diode and ground potential. This rise in voltage across the diode 51 "forward" biases a transistor 61 which has its base lead connected to the cathode of diode 51. The emitter of transistor 61 is connected to the emitter of a transistor 63 which is normally conducting due to the bias applied to its base lead by the voltage divider consisting of resistors 65 and 67 connected between the negative supply lead 57 and ground potential. The collectors of transistors 61 and 63 are connected to the negative supply lead 57 through resistors 69 and 71, respectively, while the emitters are connected to a positive supply through a resistor 73. The output of the circuit is taken at the collector of transistor 63.

In operation, a pulse is applied to the input as, for example, the pulse to the input of the start amplifier and shaper. This pulse causes the tunnel diode 51 to switch for a time period equal to the decay time constant of the L-R network which forces the diode back to its stable state ready to receive another pulse. When diode 51 switches transistor 61 is switched "on" and transistor 63 is switched "off," thus presenting a —12-v. pulse at the output for a time period equal to the timing constant of the L-R network. In both the start and stop shapers 9 and 25 the output pulse has a duration of 100 ns. Other time periods, as in the output gate 19 and the stop gate 31, are provided by changing the values of inductor 55 and resistor 59. When using the circuit as a gate, the pulses to be gated are applied to the input as described above and the gate may be turned "on and "off" in a conventional manner as by connecting a transistor switch between the input terminal and ground so that when the transistor is nonconducting the gate is "on" and when it is conducting the pulses are shorted to ground and the gate is "off."

Referring now to FIG. 4, there is shown a bistable switch of the tunnel diode-operated type. The circuit consists of a tunnel diode 81 having the anode connected to ground potential with the cathode connected to two negative inputs through resistors 83 and 85, respectively, and to a positive reset input through a resistor 87. The cathode of diode 81 is further connected through an inductor 89 to the collector electrode of a bias current stabilizing transistor 91. Inductor 89 blocks the input pulse current from transistor 91 and insures that the current flows through the diode. The emitter of transistor 91 is connected through a biasing resistor 93 to a negative voltage supply. The base of transistor 91 is connected to ground potential through a biasing resistor 95 and the negative supply through a variable biasing resistor 97. The remainder of the circuit is identical to the common-emitter connected transistor switch of the monostable circuit which is identified by like reference numerals having a single prime notation.

In operation, the bistable switch differs from the monostable switch in that the diode 81 is biased for bistable operation, that is, the bias current $I_b'$ is of a value which biases the diode initially just below the voltage peak such that the current from both the negative inputs must be present before the diode will switch. The diode performs an AND logic function when biased in this manner. Once the diode is switched, it will remain in the second stable state until a current is applied in the opposite direction to that of the initial switching current forcing the current back to the value of $I_b'$. Therefore, a positive current pulse is applied through resistor 87 from the reset circuit 43 when the circuit is reset. The switching action of transistors 61' and 63' takes place in the same manner as discussed above in the monostable circuit. Transistor 61' is normally nonconducting and transistor 63' is normally conducting in the reset state. Once the diode switches states transistor 61' is turned "off." Thus, it is apparent that this bistable switch can be used to perform the logic and switching functions in both the start and stop logic and coincidence gates 11 and 27.

Although the digital intervalometer of the present invention has been shown and described with reference to a preferred embodiment thereof, it will be obvious to those skilled in the art that various changes in form and details may be made therein without departing from the spirit and scope of the invention.

What is claimed is:

1. A digital intervalometer wherein time measurements are made by counting the number of clock pulses occurring in a given time interval which is initiated by a "start" signal and terminated by a "stop" signal, comprising:

means for generating a continuous series of clock pulses;

an output gate connected to the output of said generating means, said output gate having an "on" input and an "off" input so that appropriate input signals applied thereto turn said gate "on" and "off," respectively;

a stop gate having a first input connected to receive said clock pulses and an "on" input for receiving a signal to enable said stop gate to pass said clock pulses;

a first gating means having an output connected to said "on" input of said output gate for receiving said "start" signal and said clock pulses and generating an enabling signal upon the occurrence of the first clock pulse following the application of said "start" signal;

a second gating means connected to said "off" input of said output gate and the "on" input of said stop gate for receiving said "stop" signal and said clock pulses and generating a disabling signal upon the occurrence of the first clock pulse following the application of said "stop" signal;

a first time-to-amplitude converter having a first input connected to receive said "start" signal and a second input connected to the output of said output gate for providing an analogue output signal proportional to the time interval between the application of said "start" signal and a first signal from said output gate following the enabling of said output gate;

a first analogue-to-digital converter connected to the output of said first vernier time converter;

a second time-to-amplitude interval converter having a first input connected to receive said "stop" signal, and a second input connected to the output of said stop gate for providing an analogue output signal proportional to the time interval between the application of said "stop" signal and a first signal from said stop gate following the enabling of said stop gate;

a second analogue-to-digital converter connected to the output of said second vernier time converter;

counting means connected to the output of said output gate, said first analogue-to-digital converter and said second analogue-to-digital converter for counting the number of clock pulses gated thereto and adding and subtracting said digital outputs of said first an second analogue-to-digital converters, respectively, to provide the total number of clock pulses occurring during the timing interval; and means connected to said first and second gating means for resetting said gates following said timing interval.

2. A digital intervalometer as set forth in claim 1 wherein said means for generating a continuous series of clock pulses includes an oscillator having a highly regulated sine wave output and a clock pulse shaper having an input connected to the output of said oscillator, said clock pulse shaper providing a square wave output pulse for each cycle of said oscillator output.

3. A digital intervalometer as set forth in claim 2 wherein said first and second gating means each include a pulse shaper for generating one square wave output upon the application of an input pulse, said square wave output having a period at least twice that of each clock pulse, and a bistable switching device having first and second AND logic inputs and a reset input, said first input being connected to the output of said pulse shaper, said second input being connected to the output of said clock pulse shaper so that said bistable switching device is set upon the application of the first clock pulse following the output pulse from said pulse shaper.

4. A digital intervalometer as set forth in claim 3 wherein said first and second gating means each further includes a delay network connected in series with the output of said bistable switching device for delaying the output of said device for a period sufficient to ensure that said output gate is enabled after the clock pulse which triggers said bistable switching device.

5. A digital intervalometer as set forth in claim 4 wherein said counting means includes a scaler and binary adder from which the total time measurement is taken.

References Cited

UNITED STATES PATENTS 3,365,664    1/1968    Weigert.

OTHER REFERENCES

Baron: "The Vernier Time-Measuring Technique," Proc. IRE, January 1957; pp. 21–29.

A. E. SMITH, Primary Examiner